Figure 1:
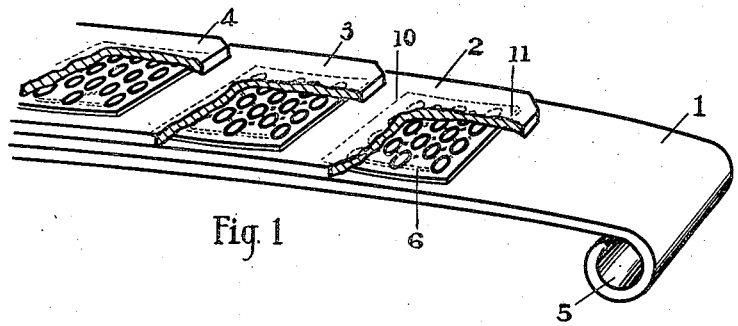

Nov. 21, 1939.   W. FRED   2,180,464
LUBRICATING BEARING FOR SPRING LEAVES
Filed June 20, 1936

INVENTOR
*Walter Fred*
BY *Carmack Waterhouse*
ATTORNEY

Patented Nov. 21, 1939

2,180,464

UNITED STATES PATENT OFFICE 2,180,464

LUBRICATING BEARING FOR SPRING LEAVES

Walter Fred, Chattanooga, Tenn.

Application June 20, 1936, Serial No. 86,410

14 Claims. (Cl. 267—50)

My invention relates to lubricating devices, and more particularly to improvements in lubricating bearings for spring leaves.

It is well known in the art of leaf springs for supporting the bodies of automobiles, and secured to the axles or chassis, that the points of greatest stress are adjacent the ends of the leaves, and such points are the source of wear, squeaks, and noise when not properly lubricated.

Many attempts have been made in the prior art to insure proper lubrication for these points. In one form a tubular bolt provided with a grease cup is seated in registering openings of the spring leaves and cooperates with a series of slotted plates, resting between the leaves, for supplying lubricant thereto. Reifsnider, 1,209,030.

In another form, slots joined by grooves, are formed in alternate leaves of a spring, and lubricant is embedded in the slots to lubricate the ends of the leaves. Brown, 920,910. In a further modification thin strips of lubricant impregnated bearing metal is interposed between adjacent leaves of the spring near their ends. A thin flanged retainer with punched out barbs is disposed about the bearing material to maintain it in position by causing the hardened barbs to dig into a surface of the spring leaf. Tea, 1,927,619. And finally a single thin strip, flanged at its ends to engage the sides of the spring leaves, and provided with a plurality of grooves on one surface, filled with graphite lubricant, is seated between the leaves and secured to one of them by an appropriate lug and slot connection. Swinton, 2,028,299.

The disadvantages of all of these devices are many fold. The drilling of large bolt holes through the leaves weakens the spring, and the provision of bolts and grease cups reduces resiliency of the spring and presents a large cumbersome structure with more lubricant than necessary, and no effective means of distributing it. The provision of grooves and slots in the spring leaves themselves weakens the spring and reduces reliance and resiliency, and requires the spring to be removed and taken apart to supply lubricant. The use of small slots improperly placed leaves areas dry and unlubricated. The provision of flanges overlapping the spring leaves and lugs on the lubricating strip engaging in openings in the spring leaves require additional material and result in weakened springs. Impregnated bearing metal requires an additional retainer and must always be under pressure to properly lubricate, and requires double thickness for the retainer provides no lubrication.

Applicant with a knowledge of these objections to and defects in the prior art has for an object of his invention the provision of a lubricating bearing consisting of a thin curved metal strip with a series of staggered or offset openings protruding outwardly from one surface to form barbs which dig into one of the leaves when inserted between adjacent leaves near their ends and prevent displacement of the strip. The curved or bowed body portion raises the rough edges out of contact with the adjacent spring and prevents squeaking when moving relative thereto. Lubricant provided in the openings or slots reach and thoroughly cover the entire area of stress, and eliminate all dry spots which wear, squeak and produce noise.

Another object of my invention is the provision of non-circular or oblong openings in the bearing strip to give a maximum lubricated bearing area.

A further object of my invention is the provision of a bearing strip with openings therethrough for the reception of lubricant, and veins or grooves therein, between the openings, for always equalizing the supply and insuring that the entire area is equally lubricated.

A further object of my invention is to provide a bearing strip with a plurality of openings therethrough, veins or grooves joining said openings, and a large central opening providing a reservoir and adapted to feed lubricant through veins or grooves to the openings.

A still further object of my invention is to provide barbs or pressed out portions on a lubricating bearing strip to engage in a spring leaf and prevent relative movement whereby to eliminate the use of flanges and lug interlocking means.

Other objects and advantages of my invention will appear in the following specification, and the novel features of the invention will be particularly pointed out in the annexed claims.

Figure 1 shows a perspective of a spring, partly in section, with my improved bowed bearing in position. Figure 2$^A$ shows a plan view of one form of my bearing. Figure 2$^B$ shows a cross-section of Figure 2$^A$ taken on the line 2$^B$—2$^B$. Figure 3$^A$ shows a plan view of another form of my improved bearing. Figure 3$^B$ shows a cross-section of Figure 3$^A$ along the line 3$^B$—3$^B$. Figure 4$^A$ shows a plan view of a third form of my improved bearing. Figure 4$^B$ shows a cross-section of Figure 4$^A$ along the line 4$^B$—4$^B$.

In the drawing 1 designates the lower leaf of the conventional leaf spring and 2, 3, and 4 represent additional leaves of the same spring. Each end of leaf 1 is curled to form a sleeve or eye 5 for the reception of a shackle bolt or other fitting (not shown) to secure it to the chassis or the axle, depending upon the construction. The leaves are maintained in assembled relation by a central bolt or U clips (not shown), in a well known manner. In this way pressure and maximum stress is placed upon the spring leaves 1, 2, 3, and 4 near their ends, and unless the surface between adjacent leaves, near their ends, is well lubricated, there will be squeaking, wear and noise, generally created. This, however, is obviated or overcome by inserting applicant's bearing between the leaves adjacent the end of the shorter, and may be done by prying the leaves apart with a special tool particularly adapted for such purpose, and inserting the bearing.

Figure 2A:
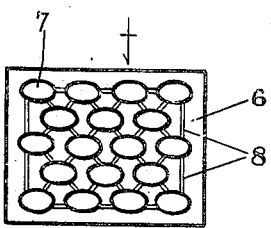

Figure 2A shows a curved or bowed bearing 6, presenting its plain surface, in which is punched or otherwise formed non-circular of oval openings 7, for the bearing may be made of very thin metal by a process which hardens the outer surface but leaves the inner part soft and ductile. This prevents the bearing from being so brittle that it may be easily broken, but retains the desired qualities of a hardened outer surface. Each of the openings or slots 7 is joined to its adjacent slots by grooves or veins 8 pressed or otherwise formed into the bearing surface. In this manner the lubricant is distributed or equalized at all times, for it may freely flow from the fuller to the emptier one and insure that the entire surface covered will be adequately lubricated. Such construction eliminates the condition of one full slot and other empty ones.

Figure 2B:
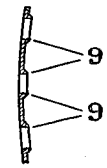

On the opposite surface, and clearly disclosed in Figure 2B, the walls defining the openings have barbs or extensions 9 protruding therefrom to engage in one of the leaves of the spring to prevent its relative displacement from such leaf. The body of the bearing is bowed or curved so that when in position between the spring leaves the rough outer edges are lifted up out of contact with the lower spring leaf in order to prevent noise and squeaking as said leaf moves with respect thereto.

In Figure 1 the barbs engage the upper leaf in each instance, so also do the rough edges 10 and 11 of the bearing, leaving only the bowed central portion of the bearing in contact with the lower leaf, so that upon relative movement between the two leaves of the spring, due to either a change in contour of the road, or to a change in the weight thereon, the bearing moves with the upper leaf and over the lower one to lubricate the area of stress, but during this movement the sharp edges of the bearing cannot scratch over the lower leaf and cause a noise. However, it is recognized that the bearing may be secured to the lower leaf and move with respect to the upper one, and one way of accomplishing this is to turn the bearing over so that the barbs anchor themselves to the lower leaf.

In Figure 2A the openings are made non-circular, formed in rows, and staggered or off-set to provide a maximum lubricating area most suitably covered, comparable with a strong barb. In this arrangement the second row of openings or slots 7 move over and lubricate the area of stress missed by the first row of slots. In addition these openings have but little metal between them and present an almost complete lubricating reservoir.

Figure 3A:
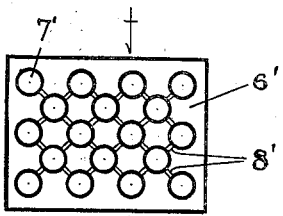

In the modification 6' of Figure 3A, 7' designates circular openings or slots formed in rows and off-set or staggered in order to cover the entire bearing area, and insure adequate lubrication. 8' represents veins or grooves communicating with the slots, and openings to equalize the lubricant and provide continuous communication throughout. The body portion of this bearing is bowed or curved in a manner like the preceding embodiment.

Figure 3B:
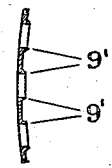

In Figure 3B the extensions or barbs 9' defining the slots are on the opposite side from the veins or grooves 8', as in the preceding modification, so that when in place they ordinarily seat in the upper leaf and the grooves 8' lie facing the lower leaf. However, the grooves could be formed on either or both surfaces.

Figure 4A:
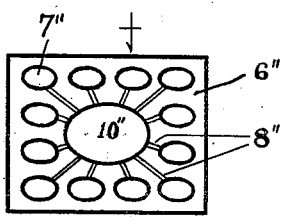
Figure 4B:
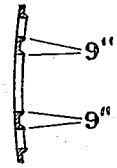

Figure 4A is another modification, where 6'' represents a bearing having a plurality of non-circular or oblong openings 7'' formed therein for the reception of lubricant, and a large central reservoir 10'' connected to said openings 7'' by grooves or veins 8''. These insure equalization of lubricant in a manner already set forth. On the surface opposite the grooves or veins, barbs or extensions protrude outwardly from the walls defining the opening 7'' for seating in a spring leaf and preventing relative movement. The body portion, like the other modifications, is curved or bowed in order that the rough edges may not scrape across the lower leaf of the spring and produce noise. The barbs generally bite into the upper leaf so that the opposite surface of the bearing faces the lower leaf so that the communicating veins or channels 8'' cooperate with such leaf to permit free flow of lubricant. Figure 4B shows the barbs 9'' in detail.

In practice each of the above bearings, their openings or slots packed with grease or other lubricant, are inserted between the spring leaves, barbs up so that the bowed central portion thereof contacts the lower leaf and separates it from engagement with the sharp edges of the bearing and thereby eliminating scraping and noise. The barbs dig into the upper leaf and prevent relative movement. The opposite surface, containing the grooves faces the lower leaf and cooperates with it to permit free flow of lubricant between the openings or slots. However, the bearing may be inserted to seat in the lower rather than the upper leaf.

The present showing should not be construed to limit applicant's invention to those constructions, for it is contemplated that grooves may be formed on either or both surfaces of the bearing, and other forms and arrangements may be made.

Having thus described my invention, I claim:

1. A spring leaf bearing comprising a bowed plate for insertion between a pair of spring leaves adjacent their ends, rows of lubricant receiving openings formed therein, the openings of each alternate row being staggered with respect to the others, lubricant seated in said openings, and means cooperaing with one of a pair of spring leaves to hold said plate against relative displacement with respect thereto.

2. A spring leaf bearing comprising a bowed plate for insertion between a pair of spring leaves adjacent their ends, rows of lubricant receiving openings formed therein, the openings of each alternate row being off-set with respect to each other, lubricant in said openings, and barbs projecting from the wall defining said openings for seating in one of a pair of spring leaves to hold said plate against displacement relative thereto.

3. A bearing comprising a plate of curved formation for insertion between a pair of spring leaves adjacent their ends, a plurality of lubricant receiving openings formed therein, and grooves formed in one face of said plate for connecting said openings to always insure an equal distribution of lubricant throughout said bearing.

4. A spring leaf bearing for insertion between a pair of spring leaves adjacent their ends comprising a bowed plate, a plurality of lubricant receiving openings formed therein, grooves connecting said openings to insure an equal distribution of lubricant throughout said bearing, and barbs projecting from one surface of said plate for seating in one of a pair of spring leaves to hold said plate against displacement relative thereto.

5. In a bowed spring leaf bearing for insertion between a pair of spring leaves, rows of lubricant receiving openings formed therein, the openings of each alternate row being staggered with respect to the others, grooves formed in the surface of said bearing facing the lowermost of said leaves and communicating with said openings for the equalization of lubricant, and means cooperating with one of a pair of spring leaves to hold said plate against relative displacement with respect thereto.

6. A spring leaf bearing comprising a curved plate for insertion between a pair of spring leaves adjacent their ends, rows of circular lubricant receiving openings formed therein, the openings of each alternate row being staggered with respect to the others, grooves communicating with said openings for equalization of lubricant, and means cooperating with one of a pair of spring leaves to hold said plate against relative displacement with respect thereto.

7. A lubricating bearing for insertion between a pair of spring leaves adjacent their ends comprising a curved plate, a plurality of lubricant receiving reservoirs formed therein, grooves formed in one face of said plate for connecting said reservoirs, means on the opposite face for cooperating with one of a pair of members to be lubricated to prevent displacement relative thereto.

8. A lubricating bearing for insertion between a pair of spring leaves adjacent their ends comprising a bowed plate having hardened outer surfaces and a soft inner portion, a plurality of lubricant receiving reservoirs formed therein, lubricant seated in said reservoirs, and barbs having a hardened surface and a soft inner portion projecting from a face of said plate for cooperating with one of a pair of members to be lubricated to hold said plate against relative displacement.

9. A spring leaf bearing for insertion between a pair of spring leaves adjacent their ends comprising a bowed plate having a hardened outer surface and soft inner portion, rows of circular lubricant receiving openings formed therein, the openings of each alternate row being staggered with respect to the other openings, channels formed in one face of said plate and communicating with said openings for equalizing the lubricant, and projections extending outwardly from the opposite face, formed by the walls defining said openings, whereby to seat in one of a pair of spring leaves to hold said plate against relative displacement with respect thereto.

10. As a new article of manufacture, a bearing insert for use between adjacent laminations of a leaf spring, said insert having a concave side and a convex side and formed of flexible steel adapted to yieldably resist a pressure tending to flatten same, and a plurality of sharp projections provided on the concave side for engagement with one of said laminations, leaving the other lamination free to slide upon the convex side.

11. As a new article of manufacture, a bearing insert for use between adjacent laminations of a leaf spring, said insert having a concave side and a convex side and formed straight along its longitudinal axis and arcuate transversely thereof to provide a line contact along the convex side, and a plurality of sharp projections provided upon the concave side for engagement with one of said laminations, leaving the other lamination free to slide upon the convex side.

12. A spring leaf bearing comprising a plate, rows of non-circular lubricant receiving openings formed therein, the openings of each alternate row being staggered with respect to the others, grooves formed in the lower face and communicating with said openings for the equalization of lubricant, and means projecting from the upper face for cooperating with one of a pair of spring leaves to hold said plate against relative displacement with respect thereto.

13. A spring leaf bearing for insertion between a pair of spring leaves adjacent their ends comprising a plate, rows of lubricant receiving openings formed therein, the openings of each alternate row being off-set with respect to the others, lubricant in said openings, grooves formed in the lower face and communicating with said openings for the equalization of lubricant, and barbs projecting from the other face of said plate for seating in the upper of said pair of spring leaves to hold said plate against relative displacement with respect thereto.

14. A spring leaf bearing for insertion between a pair of spring leaves adjacent their ends comprising a plate having a hardened outer surface and a soft inner portion, rows of non-circular lubricant receiving openings formed therein, the openings of each alternate row being staggered with respect to the other openings, channels formed in one face of said plate and communicating with said openings for equalizing the lubricant, and projections extending outwardly from the opposite face, formed by the walls defining said openings, whereby to seat in one of a pair of spring leaves to hold said plate against relative displacement with respect thereto.

WALTER FRED.